United States Patent
Anno

(10) Patent No.: US 7,941,844 B2
(45) Date of Patent: May 10, 2011

(54) INFORMATION PROCESSING APPARATUS AND CONTROL METHOD THEREOF

(75) Inventor: Makoto Anno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 450 days.

(21) Appl. No.: 12/173,993

(22) Filed: Jul. 16, 2008

(65) Prior Publication Data
US 2008/0289031 A1  Nov. 20, 2008

Related U.S. Application Data

(63) Continuation of application No. PCT/JP2008/055575, filed on Mar. 25, 2008.

(30) Foreign Application Priority Data

Mar. 28, 2007  (JP) .................. 2007-085888

(51) Int. Cl.
*G06F 21/00* (2006.01)
(52) U.S. Cl. ................. 726/17; 726/4; 726/21; 713/184
(58) Field of Classification Search ............... 726/4, 17, 726/21; 358/1.14; 713/11, 201, 203, 184
See application file for complete search history.

(56) References Cited

U.S. PATENT DOCUMENTS

| 7,565,341 | B2 * | 7/2009 | Campbell et al. ................... 1/1 |
| 7,685,204 | B2 * | 3/2010 | Rogers .......................... 707/770 |
| 2002/0199118 | A1 * | 12/2002 | Yardley et al. ................ 713/201 |
| 2004/0168092 | A1 * | 8/2004 | Adachi ....................... 713/202 |
| 2004/0220791 | A1 * | 11/2004 | Lamkin et al. .................. 703/11 |
| 2005/0003330 | A1 * | 1/2005 | Asgarinejad et al. ........... 434/20 |
| 2006/0174308 | A1 * | 8/2006 | Fuller et al. ................... 725/133 |
| 2007/0052993 | A1 * | 3/2007 | Anno ........................... 358/1.14 |
| 2007/0079252 | A1 * | 4/2007 | Ramnani ...................... 715/781 |
| 2007/0134644 | A1 * | 6/2007 | Jones et al. .................... 434/365 |
| 2007/0179955 | A1 * | 8/2007 | Croft et al. ...................... 707/9 |

FOREIGN PATENT DOCUMENTS

| EP | 1764722 | 3/2007 |
| JP | 08-279808 | 10/1996 |
| JP | 11-205314 | 7/1999 |
| JP | 2004-110681 | 4/2004 |
| JP | 2005-129051 | 5/2005 |
| JP | 2005-175530 | 6/2005 |
| JP | 2007-072605 | 3/2007 |

* cited by examiner

*Primary Examiner* — Joe H Cheng
(74) *Attorney, Agent, or Firm* — Fitzpatrick, Cella, Harper & Scinto

(57) ABSTRACT

Access right information of a login user is acquired, and an object accessible by the login user is identifiably displayed on an area corresponding to the user. When a collaboration mode in which a plurality of users log in and make a cooperative work is set, an object accessible by each login user is identifiably displayed on an area corresponding to each user.

5 Claims, 10 Drawing Sheets

INFORMATION PROCESSING APPARATUS AND CONTROL METHOD THEREOF

RELATED APPLICATIONS

This application is a continuation of International Application PCT/JP08/055575, filed Mar. 25, 2008, claims benefit of that application under 35 U.S.C. §120, and claims benefit of Japanese Patent Application 2007/085888, filed Mar. 28, 2007, under 35 U.S.C. §119. The entire disclosures of both mentioned applications are incorporated herein by reference.

BACKGROUND OF THE INVENTION

1. Technical Field

The present invention relates to an information processing apparatus to which a plurality of users can log in, and a control method thereof.

2. Background Art

In recent years, problems of illicit accesses and bringing out of personal information have occurred, and information management based on a security technique is strongly demanded. For example, personal authentication using an ID and password is executed before use of an information apparatus, or access rights of files are set, and executable operations are controlled for each user. Such demand is arisen not only for a personal computer but also for an MFP (Multi-Function Peripheral).

Since the MFP has a function of scanning a document, and printing, saving, or displaying the scanned information, it assumes the role of a tool for advancing business activities without using any PC. For example, assume that this MFP is installed in a place where everyone gathers such as a meeting room, arranging space, or the like, and the following activities are made using the MFP. That is, the documents required in a meeting or arrangement are output from the MFP and are displayed to be observable from participants. Furthermore, the result of study in the meeting or arrangement is saved and is distributed to respective participants. For this purpose, the MFP is required to hold data possessed by respective participants so as to allow the participants to easily share these data. In this case, in order to allow the participants to share data while assuring security, a mechanism in which all participants of the meeting log in to one or a plurality of MFPs, which have work areas for respective participants, and the participants hold access rights in their work areas is required. A state in which a plurality of users simultaneously log in to be able to collaborate with each other will be referred to as a collaboration mode, and an MFP which can achieve the collaboration mode will be referred to as a collaborative MFP. Note that known is Patent Reference 1 below, which discloses a technique that allows a user to log in to the MFP when the user uses the MFP.

Patent Reference 1: Japanese Patent Laid-Open No. 2005-175530

DISCLOSURE OF INVENTION

Problems that the Invention is to Solve

In the meeting or arrangement in the collaboration mode, participants come together each bringing data files, and advance discussions by displaying these files on a large-size display or projector screen. For example, when a certain user is about to access a data file, an access right of which is set for that user, that operation is displayed on the display, and other participants may see the contents of the data file that he or she does not want to be seen. Such situation cannot be avoided in the collaboration mode in which data are shared.

Patent Reference 1 above implements a function of executing user authentication when the user uses the MFP, and providing an operation environment to that user. However, the Reference assumes that the MFP is used by a single user.

It is an object of the present invention to solve the conventional problems.

A characteristic feature of the invention of the present application is to prevent information from leaking to other users by changing an object display format depending on whether or not the collaboration mode that allows a plurality of users to work collaboratively is set.

Means of Solving the Problems

In order to achieve the above object, an information processing apparatus according to one aspect of the present invention comprises the following components. That is, an information processing apparatus for allowing a plurality of users to log in, characterized by comprising:

acquisition means for acquiring access right information of a login user;

object display means for identifiably displaying an object accessible by the login user on an area corresponding to the user based on the access right information acquired by said acquisition means;

setting means for setting a collaboration mode in which a plurality of users log in and make a cooperative work; and display change means for changing a displayed object displayed by said object display means in accordance with whether or not said setting means sets the collaboration mode.

In order to achieve the above object, a method of controlling an information processing apparatus according to one aspect of the present invention comprises the following steps. That is, a control method of an information processing apparatus for allowing a plurality of users to log in, characterized by comprising:

an acquisition step of acquiring access right information of a login user;

an object display step of identifiably displaying an object accessible by the login user on an area corresponding to the user based on the access right information acquired in said acquisition step;

a setting step of setting a collaboration mode in which a plurality of users log in, and make a cooperative work; and a display change step of changing a displayed object displayed in said object display step, in accordance with whether or not the collaboration mode is set in said setting step.

Effects of the Invention

According to the present invention, leakage of information to other users can be prevented by changing an object display format depending on whether or not the collaboration mode that allows a plurality of users to make a cooperative work is set.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 10 depicts a view illustrating an example of an operation window when a shared area is assured in addition to work areas of respective users in the collaboration mode in which two or more users have logged in.

BEST MODE FOR CARRYING OUT THE INVENTION

Preferred embodiments of the present invention will be described in detail hereinafter with reference to the accompanying drawings. Note that the following embodiments do not limit the present invention according to the scope of the claims, and all combinations of features described in the embodiments of the present invention are not always indispensable for solving means of the present invention.

Figure 1:
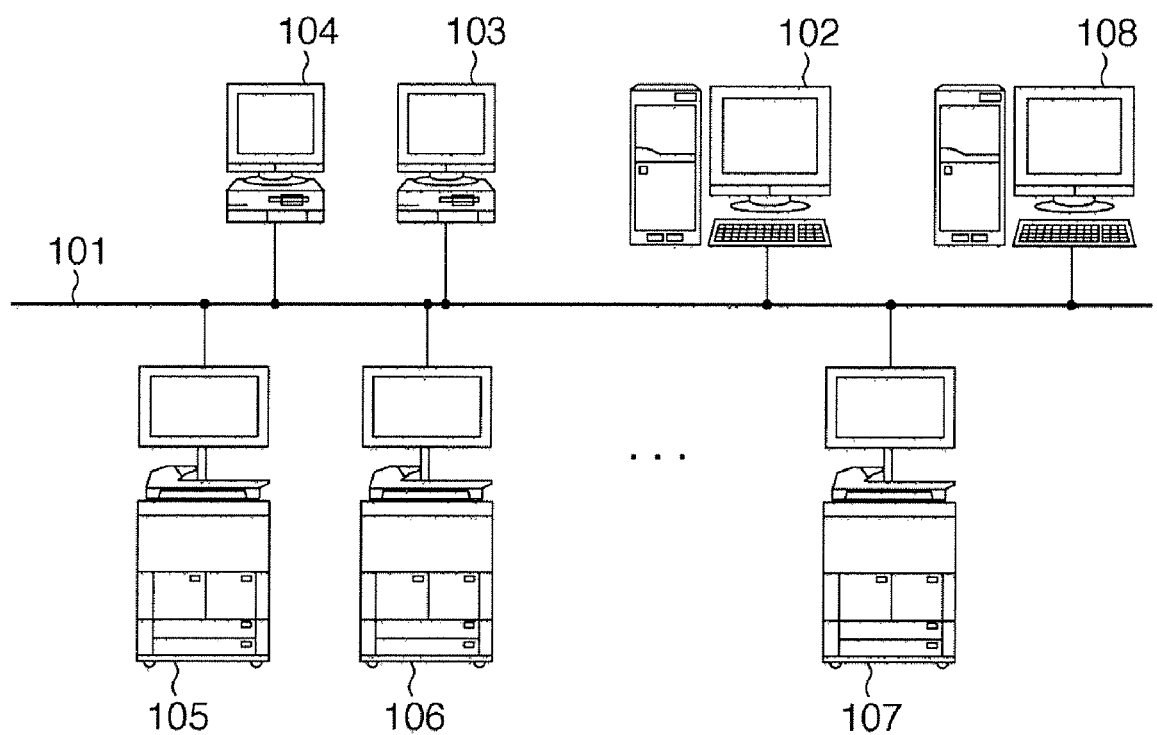
FIG. 1 depicts a view showing an example of the configuration of a network system to which an MFP according to an exemplary embodiment of the present invention is connected.

FIG. 1 depicts a view showing an example of the configuration of a network system to which an MFP according to an exemplary embodiment of the present invention is connected.

Referring to FIG. 1, reference numerals 105, 106 and 107 denote MFPs (Multi-Function Peripherals); and numeral 102 denotes a file server. Reference numeral 108 denotes an authentication server; and numerals 103 and 104 denote client PCs. The MFPs 105 to 107, file server 102, authentication server 108, and client PCs 103 and 104 are connected to be able to communicate with each other via a network 101.

The MFP 105 according to the embodiment of the present invention will be described below with reference to FIG. 2. Note that the MFP 105 will be described below. However, since the remaining MFPs 106 and 107 have the same arrangement, a repetitive description thereof will be omitted.

Figure 2:
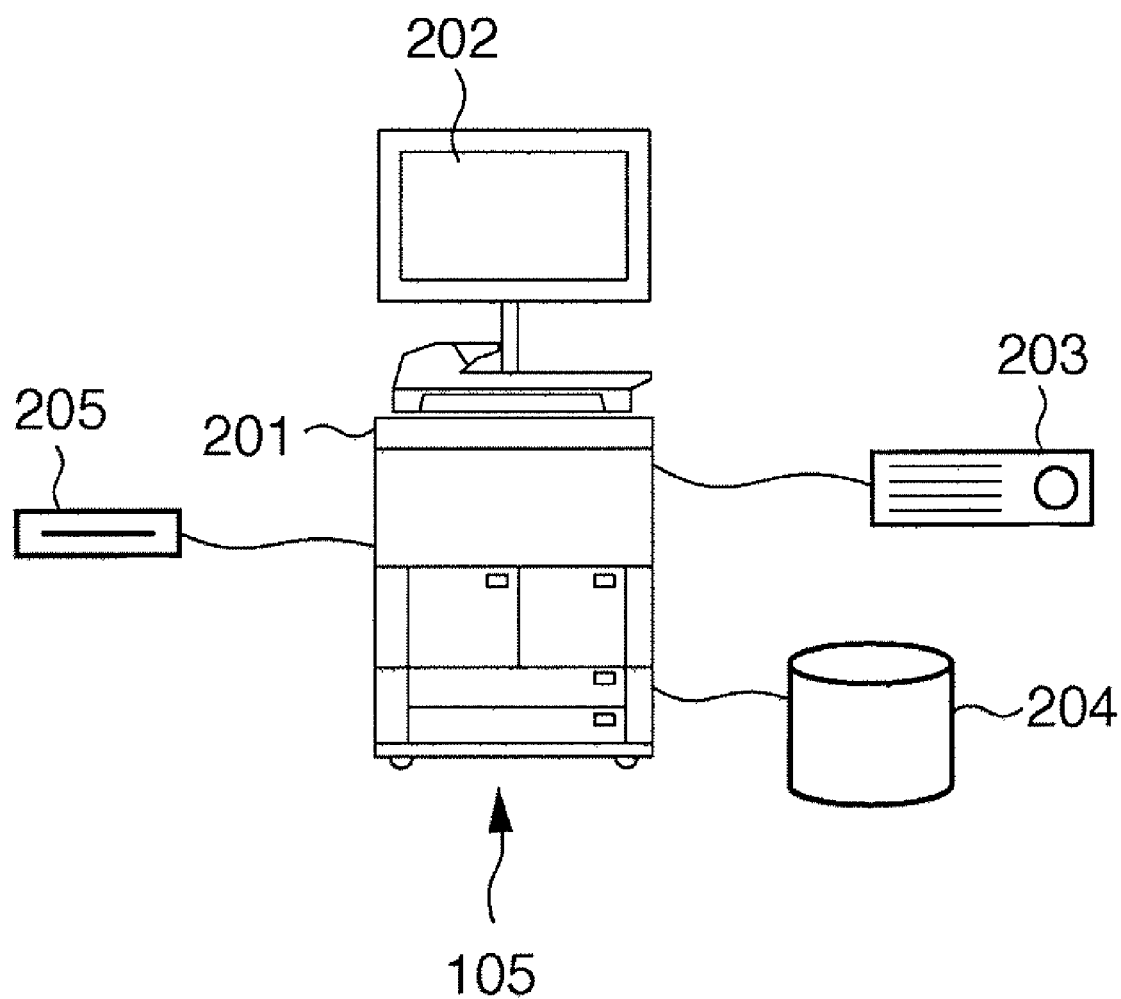
FIG. 2 depicts a view for explaining the MFP according to the embodiment.

FIG. 2 depicts a view explaining the MFP 105 according to this embodiment.

Referring to FIG. 2, reference numeral 201 denotes an MFP main body, and this MFP 105 has functions for implementing such as print processing, document scanning, and the like. A display unit 202 includes an operation unit (operation unit 302 in FIG. 3) used to make an operation input like a touch panel, and a display unit used to display the result of the input and the like on the same screen as the touch panel. Reference numeral 203 denotes a projector, which can display the contents displayed on the display unit 202 on a screen. Reference numeral 204 denotes a data storage unit which saves data in this MFP. Reference numeral 205 denotes a card reader used to read an ID card for personal authentication. However, the arrangement of the MFP 105 is not particularly limited to this. For example, the display unit 202 may be a display-dedicated device having no operation input function, and in this case, a console unit having keys and the like that accept user's operations is independently provided. The data storage unit 204 may be housed inside the main body apparatus 201. Furthermore, a device that adopts other personal authentication methods such as fingerprint authentication, iris identification, and the like may be equipped in place of the card reader 205.

Processing executed when this MFP 105 is installed in a meeting room and is used in a meeting of a plurality of participants will be explained below.

Prior to use of this MFP 105, a first participant (user A) makes the card reader 205 read an ID card of user A. User A inputs a password as needed, and makes personal authentication to log in to the MFP 105. Subsequently, the next participant (user B) makes the card reader 205 to read an ID card of user B to use this MFP 105. At this time, in a conventional MFP, since user A has already logged in, no login window is displayed, or a login access is denied even if a login window is displayed.

By contrast, in the MFP 105 according to this embodiment, even after user A has logged in, a login window for user B is displayed on the display unit 202. Then, user B inputs a password as needed to make personal authentication. User B can also log in to the MFP 105. Furthermore, according to the number of participants who join the meeting, a login window is displayed to allow the required number of participants to log in. That is, the MFP 105 according to this embodiment is configured to allow a plurality of participants to log in. In this embodiment, when a plurality of users have logged in, a collaboration mode (a mode that allows a plurality of users to make a cooperative work) is automatically set.

However, in place of automatically setting the collaboration mode in this way, the user may instruct to set the collaboration mode from the display unit 202. In this case, the collaboration mode is set irrespective of the number of login users.

The login function in the MFP 105 will be described below with reference to FIG. 3.

Figure 3:
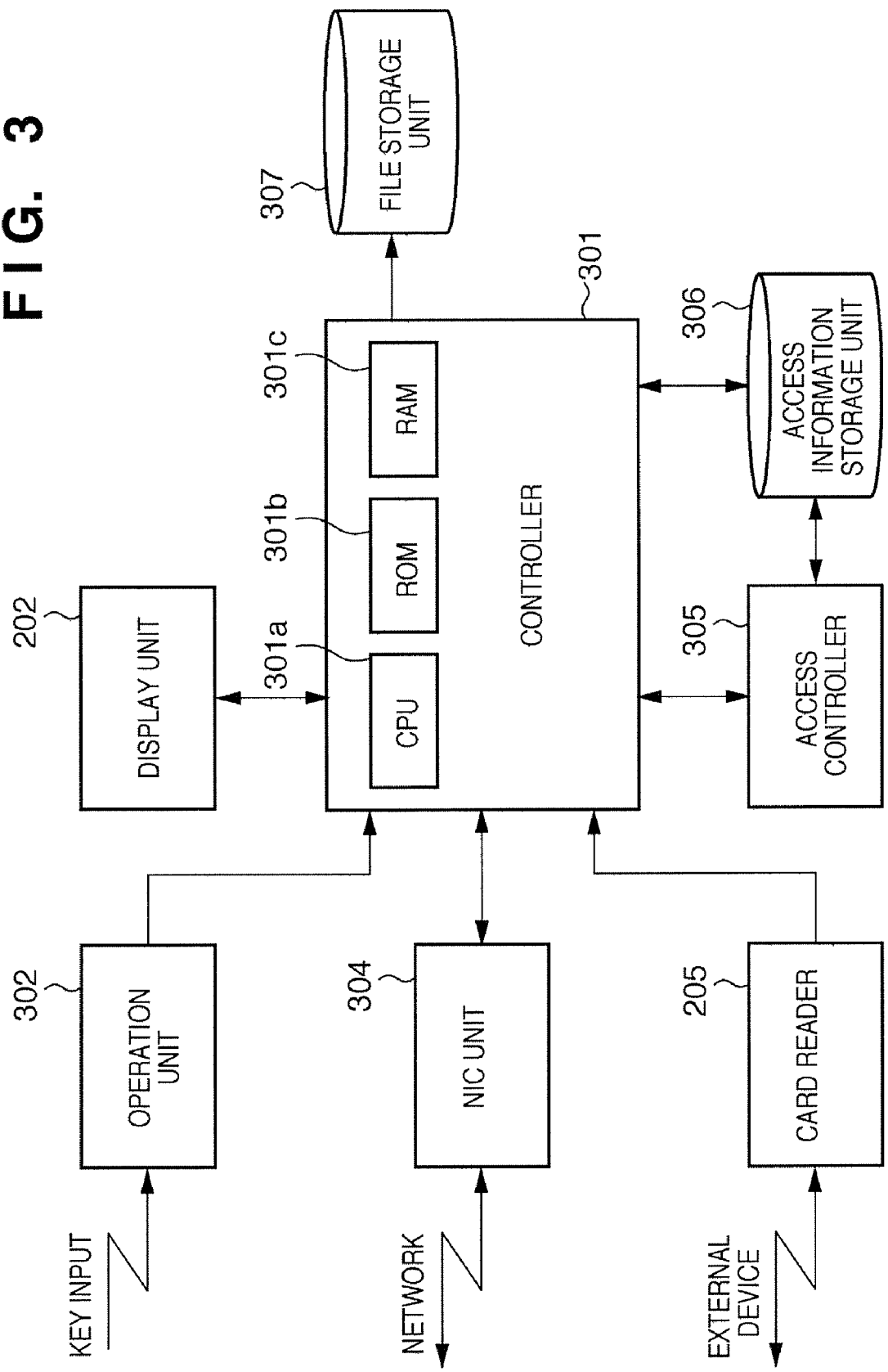
FIG. 3 is a block diagram showing the functional arrangement of the MFP according to the embodiment.

FIG. 3 is a block diagram showing the functional arrangement of the MFP 105 according to this embodiment. Note that since the remaining MFPs 106 and 107 have the same arrangement, as described above, a repetitive description thereof will be omitted.

A controller 301 controls the overall MFP 105. This controller 301 comprises a CPU 301a, a ROM 301b which stores control programs of the CPU 301a and various items of data, a RAM 301c which provides a work area upon controlling by the CPU 301a, and the like. One of control functions of this controller 301 is login control. A user makes a login operation via the card reader 205. When a card is inserted into the card reader 205, the controller 301 reads a personal ID recorded in that card. Then, the controller 301 displays, on the display unit 202, as needed, a window that prompts the user to input a PIN code required to read out internal data of the card. After that, upon acceptance of the PIN input from an operation unit 302, the controller 301 reads out the internal data of the card and executes personal authentication. When this personal authentication has succeeded, the controller 301 acquires an access control list (access right information) of the user. Since an acquisition method of the access control list depends on the arrangement of an authentication system, an example will be described below. The controller 301 accesses the authentication server 108 on the network 101 via a NIC (Network Interface Card) unit 304 to acquire the access control list of that user. The controller 301 saves the acquired access control list in an access information storage unit 306 in cooperation with an access controller 305.

The MFP 105 accesses an internal file storage unit 307 and the file server 102 to read and write files managed by them. At this time, the ranges of access rights of these files are defined in accordance with the access control lists of the users registered in the authentication server 108, and accesses to these files are controlled. These operations are implemented by techniques, that is, personal authentication and access control, and are generally known. Note that the file storage unit 307 and access information storage unit 306 are assured on the aforementioned data storage unit 204 shown in FIG. 2.

As described above, the personal authentication method may use fingerprint authentication, iris identification, and the like in addition to use of an ID card. The authentication method may be different depending on these methods, but the gist of access control remains the same.

A user interface upon login will be described below with reference to FIGS. 4 and 5.

Figure 4:
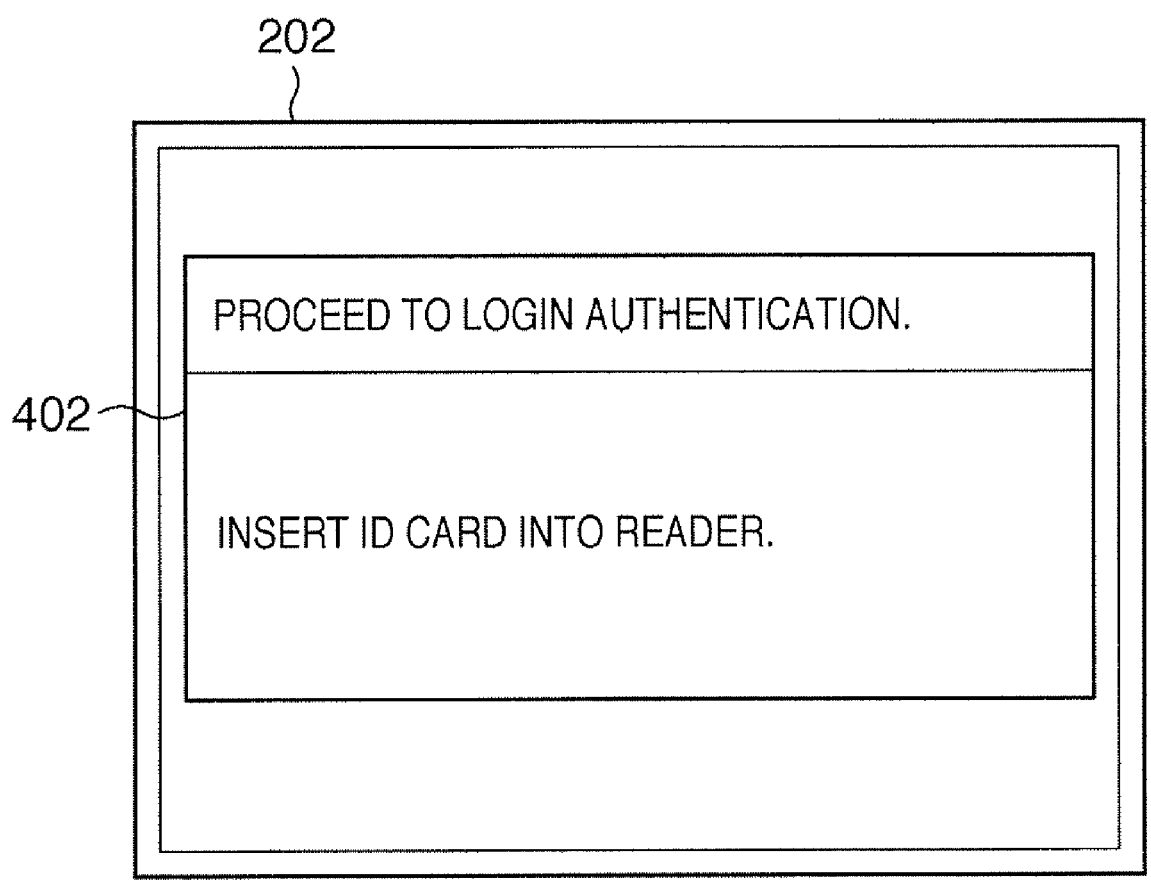
FIG. 4 depicts a view illustrating a display example on a display unit when none of users logs in to the MFP according to the embodiment.
Figure 5:
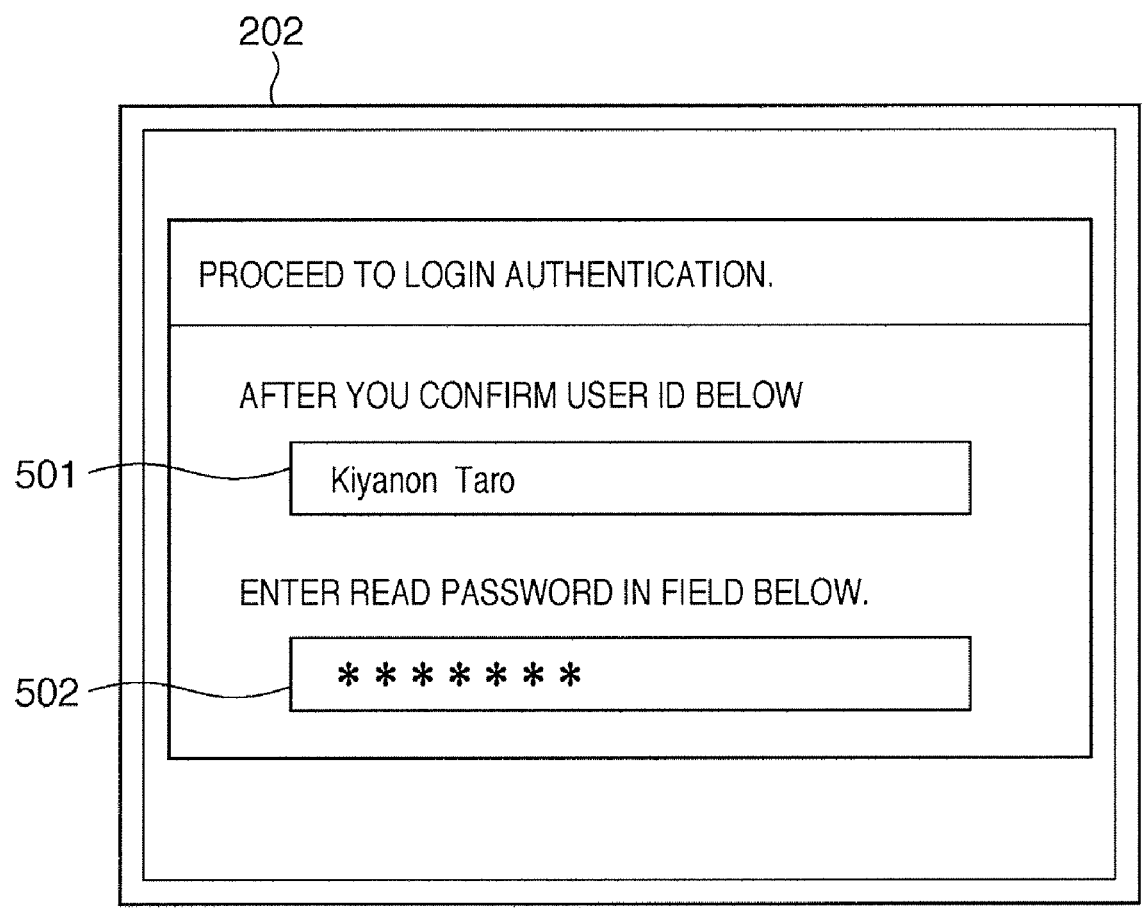
FIG. 5 depicts a view illustrating an example of the display contents displayed on the display unit when a card is read by a card reader of the MFP according to the embodiment.

FIGS. 4 and 5 depict views illustrating examples of display windows displayed on the display unit 202 (which also has an input function via a touch panel) of the MFP 105.

FIG. 4 depicts a view illustrating a display example on the display unit 202 when none of users logs in to the MFP according to this embodiment.

In this example, a message 402 ("insert ID card into reader") that prompts the user to read an ID card by the card reader 205 to attain login authentication is displayed on the screen of the display unit 202. When the authentication method is a non-contact method or fingerprint authentication, displayed text has a different description, needless to say.

FIG. 5 depicts a view illustrating the display contents displayed on the display unit 202 when the card is read by the card reader 205.

When the user makes the card reader 205 read an ID card, the display window shown in FIG. 5 is displayed. A display field 501 displays a user name (Kiyanon Taro) of the read ID card. In this way, the user can confirm the user name. A message ("enter read password in field below") that prompts the user to input a PIN code (password) required to read out authentication information in the ID card is displayed. A display field 502 is an input field of a password. In this way, when matching of the user name and password is confirmed, the user can log in to the MFP 105.

<User's Work Area>

Figure 6:
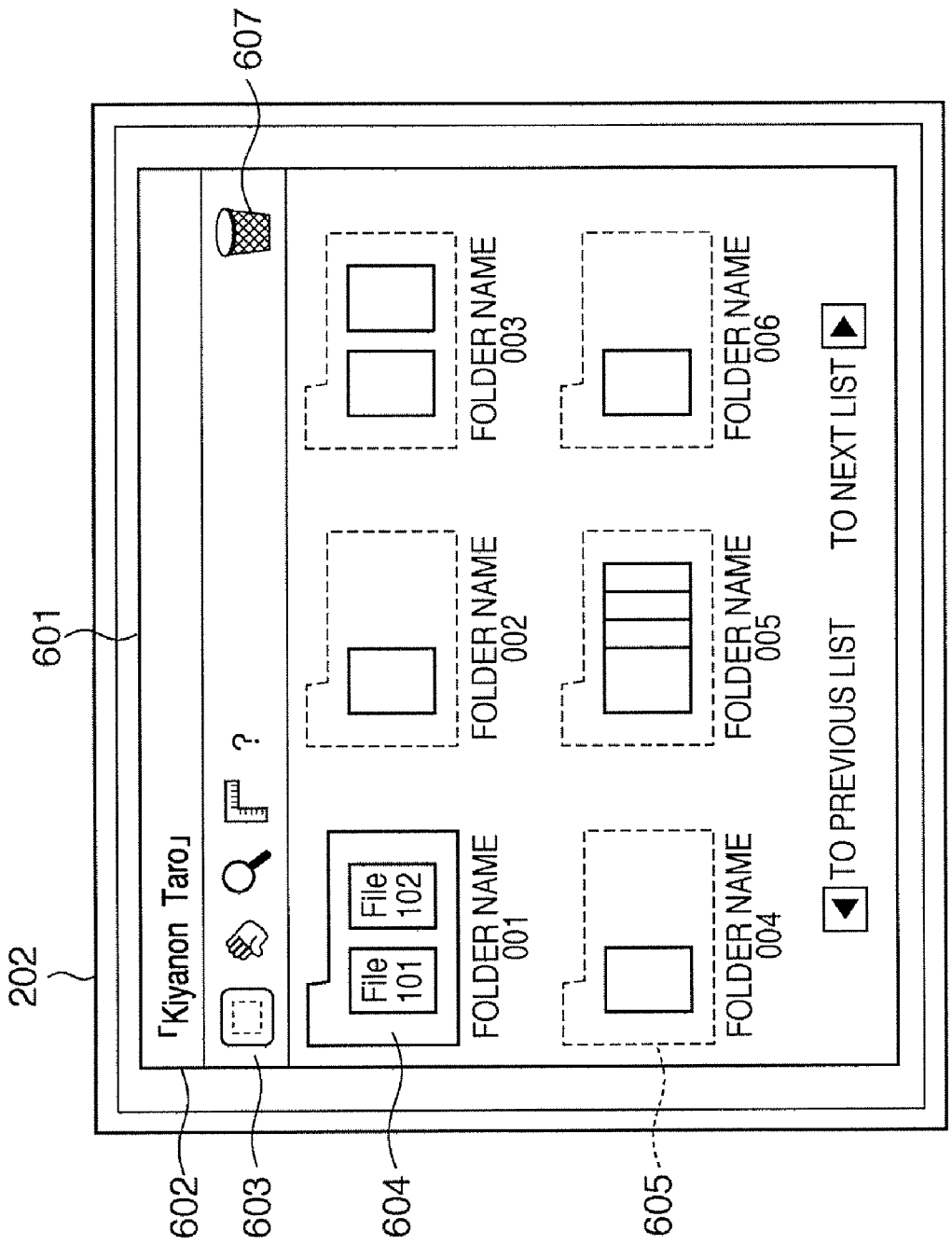
FIG. 6 depicts a view illustrating a display example of a work area customized for each user in the MFP according to the embodiment.

FIG. 6 depicts a view illustrating a display example of a work area customized for each user in the MFP according to this embodiment.

Upon completion of the login access by the user (Kiyanon Taro), a work area 601 customized for each user is displayed on the display unit 202, as shown in FIG. 6. This work area 601 is configured by a plurality of parts. More specifically, the work area 601 includes a field 602 for displaying the user name, a tool bar (command icons) 603 available for the user, and an object display area 604 where (accessible) folders and files, access rights of which are set for this user, are displayed. Since the object display area 604 displays folders and files, and also their names, the user can easily identify and select them. A folder in which the user has both read and write access rights is displayed with a solid line frame as in the object display area 604. Folders in which the user has only a read access right are displayed with broken line frames as in an object display area 605. For this reason, the user can recognize the states of the user's access rights at a glance. For image data input by scanning a document by the scan function of the MFP after the user has logged in, the access rights of the user are set to the image data.

In this way, the work area 601 customized for each user is displayed. As a result, each user can easily find out a target file, and can make a presentation using that file or can write a memo of ideas in the file as in a meeting. Also, the user can print data to which the user's access right is set, on a print sheet at an arbitrary timing using the print processing function of the MFP.

<Login by Plural Users>

A user interface displayed when another user logs in while one or more users have logged in will be described below.

For the user (Kiyanon Taro) who has already logged in, the work area 601 shown in FIG. 6 is displayed on the display unit 202. At this time, when another user inserts an ID card into the card reader 205, the window shown in FIG. 5 is displayed again. At this time, this user logs in by the method that has already been described above. With this user interface, the ID cards of a plurality of users can be authenticated to execute login processing.

The processing of the MFP 105 at that time will be described below using FIG. 3. When the second or subsequent user makes a login access, the controller 301 accesses the authentication server 108 on the network 101 via the NIC unit 304 to acquire an access control list of that user as in the first user.

The controller 301 saves the acquired access control list in the access information storage unit 306 in cooperation with the access controller 305. By this operation, the access control lists for a plurality of users are saved in the access information storage unit 306, and since the access control list of each user can be identified (identifiable) by each user ID, the access control lists can be saved without confusion.

<Work Areas of Plural Users>

Figure 7:
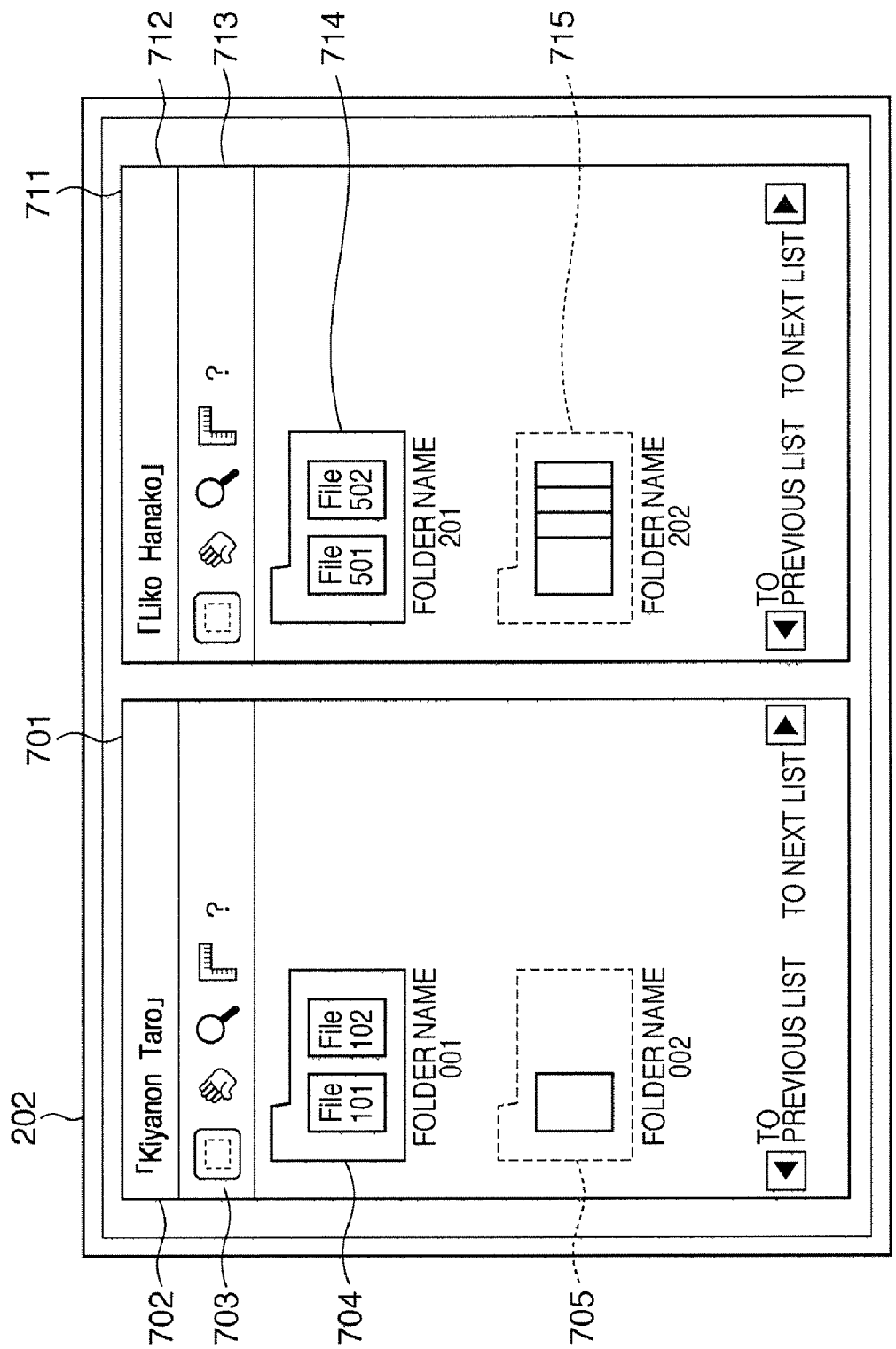
FIG. 7 depicts a view illustrating a display example of work areas customized for respective users when a plurality of users have logged in to the MFP according to the embodiment.

FIG. 7 depicts a view illustrating a display example of work areas customized for respective users after completion of the login accesses of a plurality of users.

In this case, the display unit 202 displays work areas 701 and 711. Since fields 702 and 712 that display user names of the work areas 701 and 711 respectively display the corresponding user names, the user corresponding to each of the work areas can be easily identified.

In the example of FIG. 7, the user (Kiyanon Taro) of the work area 701 is permitted to make read and write accesses to files in a folder 704, but the user is permitted to make only a read access to files in a folder 705. The user (Liko Hanako) of the work area 711 is permitted to make read and write accesses to files in a folder 714, but the user is permitted to make only a read access to files in a folder 715. Upon making this operation, since the user who actually makes file operations needs to be specified, file operations (read and write accesses) are permitted after the user is specified. More specifically, one of the current login users displayed on the display area 202 is specified, and when the user has a write access right, the user is permitted to make a write access to a file (to save or change the file).

In the example of the display window in FIG. 7, the works areas of the respective users are drawn to have similar designs (see components 702 to 705 and 712 to 715). However, each user can customize the design of the corresponding work area. Hence, the user of the work area can also be identified at a glance from the design of the work area.

In this way, when a plurality of users log in to the MFP 105 according to this embodiment, a plurality of work areas are displayed in correspondence with the users. In the example of the display window in FIG. 7, only two work areas are displayed. However, by devising a user interface (e.g., by scrolling the window, turning pages, and so forth), two or more work areas can be displayed.

<Access Control Methods When Plural Users Log in>

The access control method when a single user has logged in will be described, and that when a plurality of users have logged in will then be described below.

In FIG. 7, the login user can open and display a target file on the display unit 202 by designating a displayed icon or the like. For example, upon opening a file "File101" in the folder 704 of the user "user A (Kiyanon Taro)", user A designates an icon of "File101" on the work area 701 and gives the instruction to "open file". At this time, inside the MFP 105, the operation unit 302 detects if the work area 701 is designated upon reception of the "open file" instruction.

The controller 301 controls the access controller 305 to acquire the access control list of "user A" of the work area 701 from the access information storage unit 306, and accesses to the file "File101" using the acquired list. At this time, when the file "File101" is located on the file server 102 on the network 101, the controller 301 accesses to the file via the NIC unit 304; if the file is stored in the file storage unit 307 in the MFP 105, the controller 301 directly accesses to the file.

On the other hand, upon opening a file "File501" in the folder 714 of "user (Liko Hanako) B", the user designates an icon of "File501" in the work area 711 and gives the instruction to "open file". At this time, inside the MFP 105, the operation unit 302 detects if the work area 711 is designated. The access controller 305 acquires the access control list of "user B" of the work area 711, and accesses to the file "File501" using the acquired list. At this time, if the file "File501" is located on the file server 102 on the network 101, the controller 301 accesses to the file via the NIC unit 304; if the file is stored in the file storage unit 307 in the MFP 105, the controller 301 directly accesses to the file.

As described above, a file is accessed using the access control list of the login user of the access-instructed work area. This method is not limited to files but it can also be applied to an object which undergoes access control using the access control list.

<Sequence of Processing in MFP>

Figure 8:
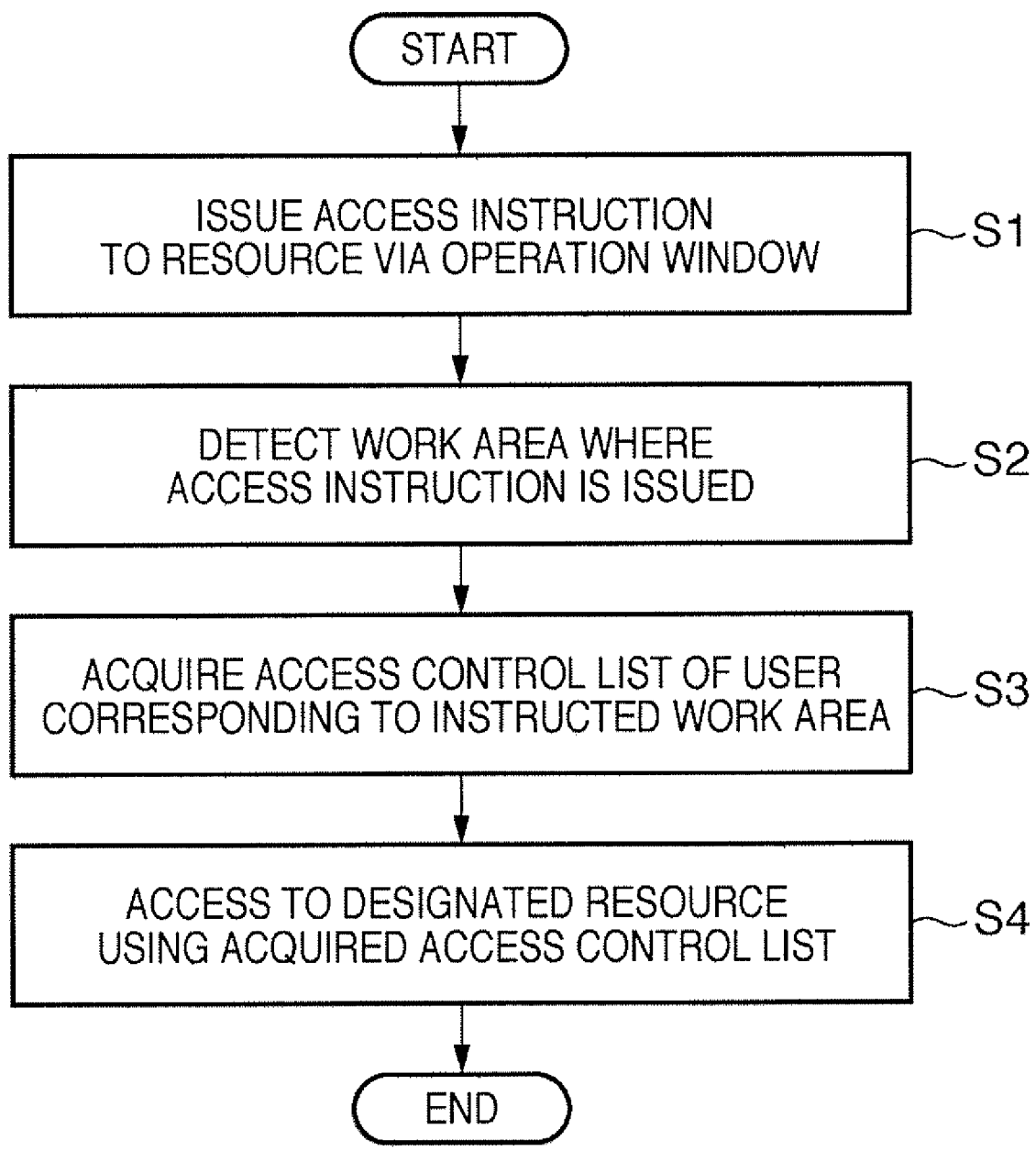
FIG. 8 is a flowchart explaining access control in the MFP according to the embodiment.

FIG. 8 is a flowchart explaining the access control in the MFP according to this embodiment. Note that a program for implementing this processing is stored in the ROM 301b, and the processing is executed under the control of the CPU 301a.?

In step S1, the CPU 301a accepts an access instruction for a predetermined object via the operation unit 302 while a plurality of users have logged in. The CPU 301a determines in step S2 on which work area the access instruction was made. After the work area is specified, the process advances to step S3 to specify a user of that work area and to acquire an access control list of the user corresponding to the access-instructed work area. In step S4, the controller 301 controls an access to the object designated by the user with reference to the access control list acquired in step S3.

In this manner, an access instruction for an object in the work area at the operation unit 302 is executed using the access control list of the user of the work area within the access right range.

<Changeover of User's Work Area>

As described above, when a user has solely logged in, the work area 601 is displayed, as shown in FIG. 6. At this time, an environment to be displayed upon login is stored in advance in a setting file, and the window is displayed by calling the setting file of the environment. This environment setting file is set to display different work areas depending on the number of users, that is, a single user or a plurality of users (depending on whether or not the collaboration mode is set). In this manner, different windows can be displayed in accordance with display setting information depending on the number of users, that is, a single user or a plurality of users (depending on whether or not the collaboration mode is set).

For example, FIG. 6 shows the display example of the work area when a single user has logged in, and FIG. 7 shows the display example of the work areas when a plurality of users have logged in (collaboration mode). The single work area shown in FIG. 6 displays all folder names 001 to 006, but the work area of the user in FIG. 7 in which the plurality of users log in display only folder names 001 and 002 of all folders and the remaining folder names are hidden. In this way, the display mode of the work area in case of the single user can be different from that of the work areas when the plurality of users log in. In this case, since the controller 301 of the MFP controls the login processing of users, it can recognize the number of login users. Hence, the controller 301 can select an environment setting file to be used depending on the number of login users.

Also, display environments according to the number of users may be set for the folders 604 and 704, "File101" and "File102", and the like. In this manner, whether or not folders and files are displayed may be set depending on whether one or a plurality of users have logged in, thereby changing the display mode according to the number of login users.

For example, in the case shown in FIG. 6 when the single user has logged in, the work area 601 displays folder names "003" to "005" other than "001" and "002". However, in the case shown in FIG. 7 when the plurality of users has logged in, the work area 701 does not display these folder names "003" to "005". Also, a display method of, for example, a tool icon "delete" (a dust bin icon 607 in this case), which is not to be inadvertently executed, of the tool bar 603 in FIG. 6 may be changed. For example, the icon 607 may be displayed, as shown in FIG. 6, when the single user has logged in, but it is not displayed, as shown in FIG. 7, when the plurality of users have logged in.

These display modes can be implemented by preparing different environment setting files (display setting storages) depending on whether the single user has logged in (single mode) or the plurality of users have logged in (collaboration mode), and changing over whether or not to display based on the number of login users recognized by the MFP. Needless to say, the above display modes can also be implemented by a method of describing the setting values of the single mode and collaboration mode in a single environment setting file, and switching these values.

<Changeover Operation Sequence of Work Areas>

For example, when user A logs in to the MFP to which none has logged in, the display setting of the work area in the single mode for user A is used. When user B logs in while user A has logged in, the display setting of the work area in the coroboration mode for user B is used. At the same time, for user A, the display setting of the work area in the collaboration mode is switched. In this manner, the display mode for user A is switched from the display setting of the single work area shown in FIG. 6 to that of the work area when the plurality of users have logged in, as shown in the left half in FIG. 7. For user B, the display setting of the work area in the collaboration mode is used, as shown in the right half in FIG. 7.

Figure 9:
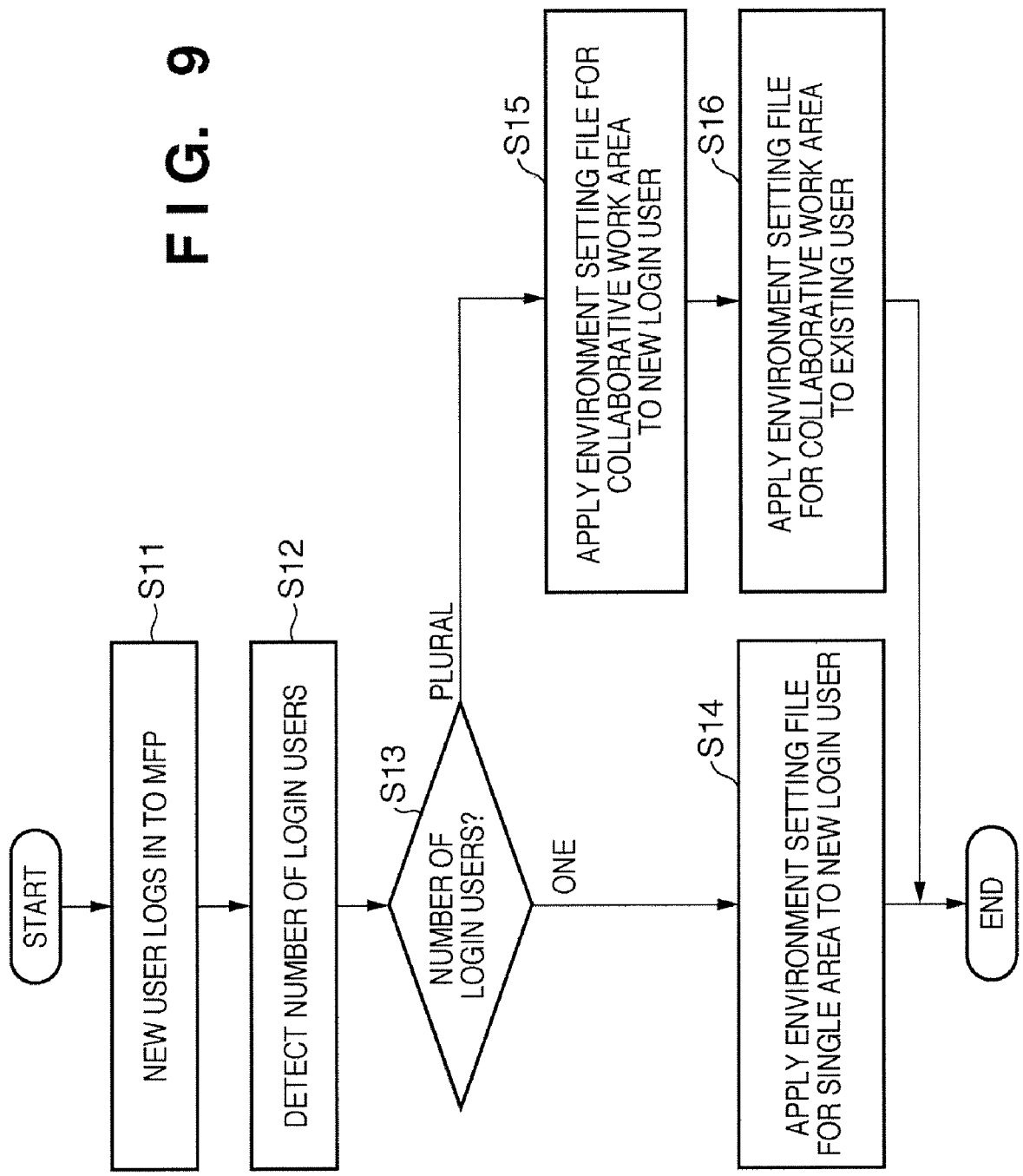
FIG. 9 is a flowchart explaining processing for detecting the number of login users in the MFP according to the embodiment.

FIG. 9 is a flowchart explaining the processing for detecting the number of login users in the MFP according to this embodiment.

In step S11, a new user logs in to the MFP. The process advances to step S12, and the controller 301 counts the number of access control lists saved in the access control information storage unit 306, thereby detecting the number of login users at that time. If no access control list is saved, it is determined that only the new user logs in (single); if one or more access control lists are saved, it is determined that a plurality of users have logged in. After the number of login users is detected in this way, the controller 301 determines in step S13 whether the number of users is one or more. If the number of login users is one, the process advances to step S14, and the controller 301 applies an environment setting file for the work area in the single mode to the new login user.

On the other hand, if the number of login users is a plural number, the process advances to step S15, and the controller 301 applies an environment setting file for the work area in the collaboration mode to the new login user. Furthermore, in step S16, the controller 301 applies an environment setting file for the work area in the collaboration mode to the user that has previously logged in.

Normally, the operations executed when the user has solely logged in are different from those in the collaboration mode. For example, in the collaboration mode, files used to make a presentation or those to be examined in a meeting are often used, and the operations for copying these files to a shared folder or sending them via e-mail after the meeting are often done. Therefore, it is efficient to display the work area in the collaboration mode, and to lay out and display these files and folders, operation tool icons, and the like, on this work area in the collaboration mode.

For example, as shown in FIG. 7, it is efficient for user A to lay out the folder names 001 and 002, and tool icons 703, which are frequently used in the collaboration modes, on the convenient top window of the work area 701. The layout shown in FIG. 7 is an example, and folders, files, tool icons, and the like to be laid out are different for respective users.

As described above, according to the MFP of this embodiment, if a plurality of users log in, then the display settings of the work areas for the users are changed over to those for the plurality of users (collaboration mode). At this time, the environment setting file in the collaboration mode specifies folders, files, and tool icons to be displayed, and designates their layout, thus displaying a convenient window for each user. Therefore, each user can form an operation window upon execution of the operations in the collaboration mode in distinction from the sole use.

<Changeover of Environment Setting Based on Meeting Log>

The access information storage unit 306 which stores the access conditions of respective users has a storage area where meeting and arrangement logs are recorded. When the collaboration mode in which a plurality of users log in is set, log information is recorded in this storage area. The log information includes the login date and time, MFP names, login user names, files and folders used, operation contents, tool icons used, and the like. Based on this log information, the previous operation state is re-displayed when the collaboration mode is set again. As a result, the previous operations can be easily restarted. The log includes documents scanned by the scanning function, and printed images, and these image data can also be read out again.

A method of displaying optimal candidates from log information with reference to the log information will be described in detail below.

For example, a search method based on a combination of login users will be explained. A case will be examined below wherein users A, B, C, and D have logged in. If a meeting in which all users A, B, C, and D participated is found, since it was recorded in meeting logs of all users A, B, C, and D, the contents recorded at that time are read out.

If no meeting in which all users A, B, C, and D participated is found, meetings in which some of these users participated are detected, these meetings are displayed as candidate meetings as choices, and a participant selects one candidate meeting. As the priority order of displaying candidates as choices at that time, meetings having the larger numbers of participants of members may be displayed as the top priority. Alternatively, meetings having the latest held dates and times may be preferentially displayed, or those including an organizer of the meeting as a participant may be preferentially displayed.

As a practical example, assume that, for example, user A made arrangements with B and that with C and D previously, and these arrangements were recorded in the meeting log of user A. In this case, the meeting log of user B describes a record of the arrangement with A, that of user C describes records of the arrangement with A and D, and that of user D describes records of the arrangement with A and C. In this case, choices including a meeting in which users A, C, and D participated as a first candidate, and that in which users A and B participated as a second candidate are displayed.

The detection method using the logs to determine the order of these choices is not limited to this method. A method of considering a user who has logged in first as an organizer, and preferentially selecting meetings in which the organizer participated as choices, a method of simply sorting meetings in the order of held dates and times, and the like may be used. When a user selects a meeting from choices displayed by an arbitrary method, the work areas of respective users are displayed with reference to the log of the meeting.

According to the aforementioned search method, when the MFP is set in the collaboration mode in which a plurality of users have logged in, it can select an optimal meeting from the meeting logs of the respective users, and can read out the recorded contents of the meeting. In this way, the files and folders used, operation contents, tool icons used, and the like are displayed on the work areas, the meeting can be restarted. Such operations are made for all login users.

A list of a plurality of meeting logs may be displayed, and the previous operation states may be re-displayed based on the meeting log selected from the list.

<Environment Setting File>

Environment setting files, meeting log files, and the like for respective users are held in an internal storage area of each MFP. When a user logs in, the environment setting file, meeting log file, and the like for the user are read out, thus switching to appropriate settings. Alternatively, environment setting files, meeting log files, and the like of respective users may be held for respective users in the server 108 on the network, and may be accessible from all the MFPs. When a user logs in, the environment setting file, meeting log file, and the like for the user are read out, thus switching to appropriate settings for the user. In this case, the environment setting file, meeting log file, and the like, whose management is unified in the server 108, can be read out independently of the MFP to which the user logs in.

Alternatively, the environment setting file, meeting log file, and the like of each user may be held in an ID card of each user. When a user logs in using the ID card, the MFP may read out the environment setting file, meeting log, and the like of the user from this ID card, thus changing over to the settings according to the readout files. In this case, the environment setting file, meeting log, and the like of each user can be used independently of the MFP to which that user logs in.

<Shared Area>

When a plurality of users have logged in to the MFP and the MFP operates in the collaboration mode, the work areas for multi-users appear on the operation window of the MFP, as has been described so far. For example, when two users have logged in, the two work areas 701 and 711 are displayed, as shown in FIG. 7. When three or more users have logged in, the work areas of these users are similarly displayed.

Figure 10:
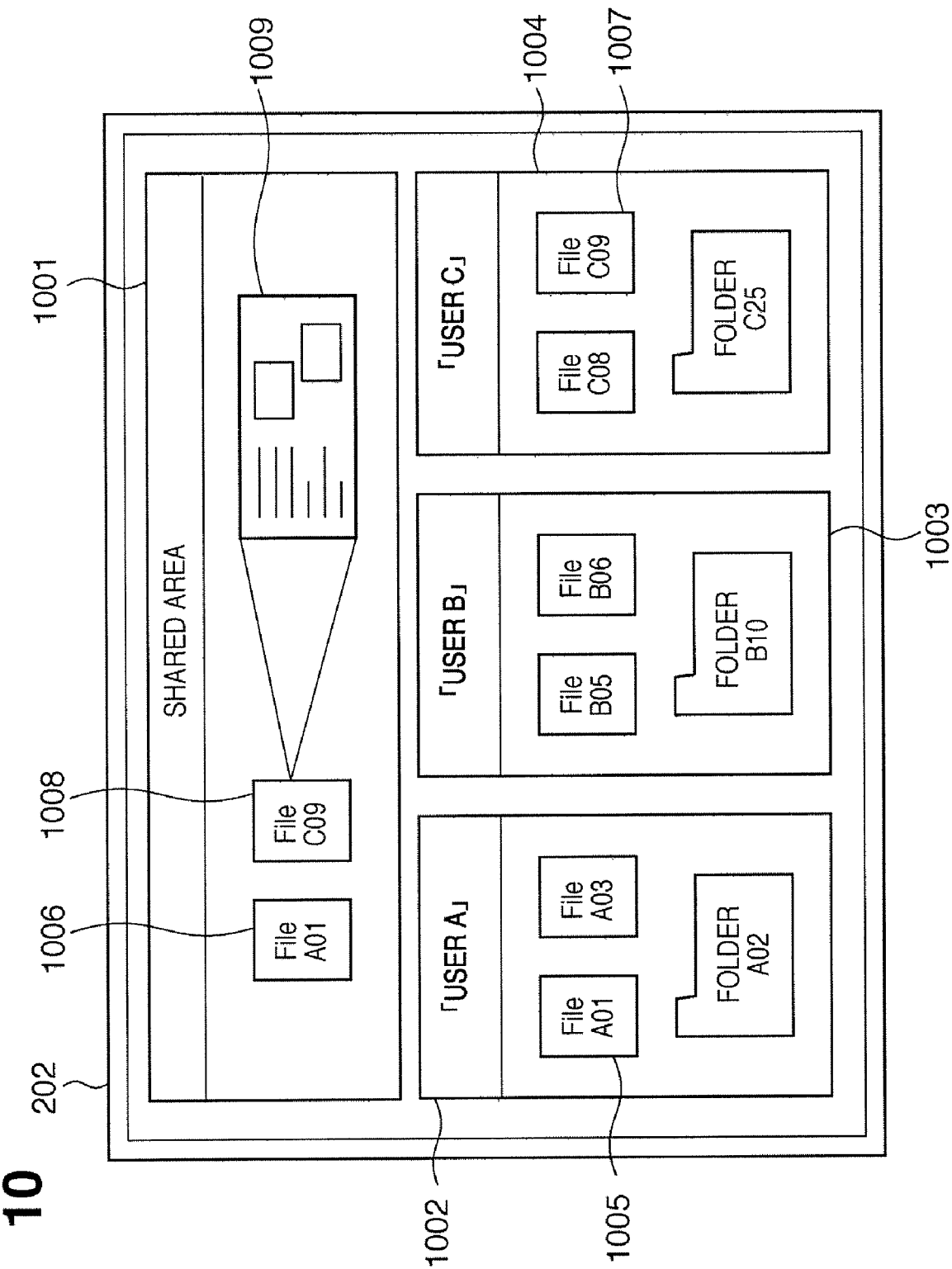

FIG. 10 depicts a view illustrating an example of an operation window when a shared area is assured in addition to the work areas of respective users in the collaboration mode in which two or more users have logged in. FIG. 10 shows an example of the operation window when three users A, B, and C have logged in.

Work areas 1002, 1003, and 1004 of login users A, B, and C are displayed on the display screen. On these work areas, the same display described so far is made. A shared area 1001 is displayed in addition to these work areas 1002 to 1004. This shared area 1001 represents access rights of all the login users under the logical product (AND) condition.

This shared area 1001 is used to refer to files and to edit them by participating users together in the collaboration mode. For example, all participants may make discussions with reference to a "file A01" 1005 held by user A. In the description given so far, the method of directly opening and referring to the "file A01" 1005 on the work area 1002 of user A has been explained. Aside from this, the "file A01" is copied to the shared area 1001. The copied "file A01" is denoted by reference numeral 1006. All the participants can make discussions with reference to this copied "file A01" 1006.

Likewise, a "file C09" 1007 held by user C is copied to the shared area 1001. The "file C09" copied to the shared area 1001 is denoted by reference numeral 1008. Then, all the participants can make discussions with reference to the copied "file C09". Upon elaborating (editing) that file C09 by all the participants in the discussions in this case, an application required to edit this file runs on the shared area 1001 to edit the contents of the file C09. A dialog 1009 indicates this edit operation in progress.

Upon completion of editing of the file, the edited contents are saved and the file is closed. Since this operation is the same as that of applications that run on a general PC, a detailed description thereof will not be given.

Furthermore, the edited "file C09" 1008 can be distributed to all the users who engage in the discussions by copying the "file C09" 1008 to the work areas of users A, B, and C. This copy operation is done according to the access right of the shared area 1001. Since the access right of the shared area 1001 corresponds to those of users A, B, and C under the logical product condition, as described above, the file can be written in the work areas of these users. However, if an identical file name exists, the user can select one of operations for overwriting the existing file, saving the new file by changing its name, and canceling copying. Since this operation is the same as that of applications that run on a general PC, a detailed description thereof will not be given.

Whether or not to display this shared area 1001 can be decided by settings. When the number of login users increases, since it is inefficient to unconditionally display the work areas of all the users on the screen with a finite space, the screen layout needs to be devised. For example, the work areas of login users may be normally displayed as small icons, and the icon may be opened when a file is copied to the shared area 1001.

<Simple Handouts Distribution>

Upon distributing the edited file to all the participating users, the file need only be copied to the work areas of the respective users. In this case, when the number of participating users is as small as three, as described above, such an operation is not troublesome. However, when the number of participating users exceeds 10, it is hard enough to copy the file to their work areas. Hence, in such case, as tool icons (not shown in FIG. 10; they are the same as those in the tool bars 703 and 713 in FIG. 7), an icon having a function of copying a file to all the participating users is displayed. By designating the icon, the designated file or the like is copied to all the login users. By providing such function, desired file and data can be distributed to all the participating users by a simple operation.

An implementation method of this copy distribution functions to all members will be explained below. As has been described above, the MFP can specify login users, and the work areas of these users exist on the MFP. The shared area 1001 has all the access rights of these users. Hence, by making a copy operation from the shared area 1001 to the work areas of all the users, the copy function to all participants can be implemented. Note that the controller 301 controls to display this distribution tool icon when a plurality of users have logged in (when the collaboration mode is set), and not to display the icon when a single user has logged in (when the collaboration mode is not set).

<Expansion of Simple Handouts Distribution>

The shared area 1001 requests a mail server to create a mailing list of the participants who participate in the current collaboration. The mailing list register e-mail addresses of the participants who participate in the current collaboration. Note that the e-mail address of each participant can be acquired by sending an inquiry to a server that manages correspondence between the users and e-mail addresses. Using the mailing list, all files, settings, and the like used on the shared area 1001 can be distributed to respective users via the e-mail, and additional discussions can be made using the e-mail. In this manner, the users can continue a virtual collaboration even when they do not meet again.

Also, the shared area 1001 requests the file server to create a shared folder. The access right of this shared folder is given to all the users who participate in the current collaboration. After the shared folder is created in the server, the shared folder can store all files, settings, and the like operated in the shared area 1001. By using this folder, the participants can separately or virtually make collaborative works even when the plurality of users do not meet in one site again for the purpose of collaboration.

Furthermore, a shared folder of the network can be used as the shared area 1001. For example, an alias of the shared folder may be used as the shared area 1001. The login users seem to manipulate the shared area 1001, but the entity of the shared area 1001 may be provided to the shared folder on the network. Alternatively, using a network file system (NFS), the shared area 1001 and shared folder may be configured as a single folder.

As described above, according to this embodiment, in the network system including one or a plurality of MFPs, a plurality of users can simultaneously log in to one MFP. At this time, the work areas of these users are displayed on the display unit of that MFP, and the users can access resources of the MFP while maintaining the access rights of the work areas. By adopting such network in a meeting system, a meeting can be conducted efficiently.

The above description has been made taking the MFP as an example. However, the same processing can be executed even in other apparatuses as long as a plurality of users can simultaneously log in to such apparatuses.

Other Embodiments

The embodiments of the present invention have been explained in detail. The present invention may be applied to either a system constituted by a plurality of devices, or an apparatus consisting of a single device.

Note that the present invention can also be achieved by directly or remotely supplying a program of software that implements the functions of the aforementioned embodiments to a system or apparatus, and reading out and executing the supplied program code by a computer of that system or apparatus. In this case, the form of program is not particularly limited as long as it has the program function.

Therefore, the program code itself installed in a computer to implement the functional processing of the present invention using the computer implements the present invention. That is, the claims of the present invention include the computer program itself for implementing the functional processing of the present invention. In this case, the form of program is not particularly limited, and an object code, a program to be executed by an interpreter, script data to be supplied to an OS, and the like may be used as long as they have the program function.

As a recording medium for supplying the program, various media can be used: for example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like.

As another program supply method, a program can be supplied by establishing a connection to a homepage on the Internet using a browser on a client computer, and downloading the program from the homepage to a recording medium such as a hard disk or the like. In this case, the program to be downloaded may be either the computer program itself of the present invention or a compressed file including an automatic installation function. Furthermore, the program code that configures the program of the present invention may be segmented into a plurality of files, which may be downloaded from different homepages. That is, the claims of the present invention include a WWW server which makes a plurality of users download a program file required to implement the functional processing of the present invention by a computer.

Also, a storage medium such as a CD-ROM or the like, which stores the encrypted program of the present invention, may be delivered to the user. In this case, the user who has cleared a predetermined condition may be allowed to download key information that decrypts the encrypted program from a homepage via the Internet, so as to install the encrypted program in a computer in an executable form using that key information.

The functions of the aforementioned embodiments may be implemented by a mode other than that by executing the readout program code by the computer. For example, an OS or the like running on the computer may execute some or all of actual processes based on an instruction of that program, thereby implementing the functions of the aforementioned embodiments.

Furthermore, the program read out from the recording medium may be written in a memory equipped on a function expansion board or a function expansion unit, which is inserted in or connected to the computer. In this case, after the program is written in the memory, a CPU or the like equipped on the function expansion board or unit executes some or all of actual processes based on the instruction of that program, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-085888, filed Mar. 28, 2007, which is hereby incorporated by reference herein in its entirety.

What is claimed is:

1. An information processing apparatus for allowing a plurality of users to log in, comprising:
    an acquisition unit configured to acquire access right information of a login user; and
    a display unit configured to display, based on the access right information acquired by said acquisition unit, an operation screen which includes a plurality of work areas each corresponding to a respective one of a plurality of login users and a shared area being shared with the plurality of login users, an access right of the shared area being defined based on a logical product of access right information of the plurality of login users,
    wherein a file copied from one of the plurality of work areas to the shared area can be edited on the shared area, and the edited file edited on the shared area can be distributed to all of the plurality of work areas.

2. The information processing apparatus according to claim 1, wherein, when there is only one login user, said display unit does not display the shared area.

3. The information processing apparatus according to claim 1, further comprising a setting unit configured to set whether or not to display the shared area.

4. A method of controlling an information processing apparatus for allowing a plurality of users to log in, the method comprising the steps of:
    acquiring access right information of a login user; and
    displaying, based on the access right information acquired in said acquiring step, an operation screen which includes a plurality of work areas each corresponding to a respective one of a plurality of login users and a shared area being shared with the plurality of login users, an access right of the shared area being defined based on a logical product of access right information of the plurality of login users,
    wherein a file copied from one of the plurality of work areas to the shared area can be edited on the shared area, and the edited file edited on the shared area can be distributed to all of the plurality of work areas.

5. A non-transitory computer readable storage medium storing a program for causing a computer to execute a method of controlling an information processing apparatus for allowing a plurality of users to log in, the method comprising the steps of:
    acquiring access right information of a login user; and
    displaying, based on the access right information acquired in said acquiring step, an operation screen which includes a plurality of work areas each corresponding to a respective one of a plurality of login users and a shared area being shared with the plurality of login users, an access right of the shared area being defined based on a logical product of access right information of the plurality of login users,
    wherein a file copied from one of the plurality of work areas to the shared area can be edited on the shared area, and the edited file edited on the shared area can be distributed to all of the plurality of work areas.

* * * * *